United States Patent Office 2,894,022
Patented July 7, 1959

2,894,022

DIESTERS OF ALIPHATIC DICARBOXYLIC ACIDS AND HYDROXY BENZOPHENONES

Carl B. Havens, Hope, and Gerald A. Clark, Midland, Mich., assignors to The Dow Chemical Company, Midland, Mich., a corporation of Delaware No Drawing. Application August 2, 1956
Serial No. 601,644

2 Claims. (Cl. 260—479)

This invention relates to new organic compounds and to polymeric compositions containing the same. More particularly it relates to new organic compounds finding utility as light stabilizers for haloethylene polymers.

Haloethylene polymers such as those containing at least 50 percent vinylidene chloride, are known to be highly sensitive to the effects of elevated temperatures and of light and under prolonged exposure to heat and light may become so degraded and discolored as to be commercially useless. It has been common practice to blend certain compounds with the polymer to stabilize it against the degradative effects of heat and light. Several of such compounds, however, are highly colored materials which impart an objectionable initial color to the stabilized composition which prevents the production of a commercially saleable white composition. Still other disadvantages of many of the previous compounds are a high odor level and volatility. Any odor in the stabilizer will be transferred to the stabilized composition. When volatile stabilizers are employed the stabilizers volatilize out of the composition leaving the composition in time unprotected against the degradative effects of light, particularly ultra-violet light. In addition all of the compounds vary in their ability to absorb ultra-violet light and it is impossible to predict the effectiveness of any particular compound with any degree of certainty, and even then some of the initially useful compounds wherein the compositions lose some of their effectiveness for absorbing ultra-violet light over a prolonged period of time.

In view of the above problems it would be desirable and it is the principal object of this invention to provide a new group of organic compounds having the stated utility.

It is a further object to provide a group of such compounds which have little or no color and have a low odor level.

Another object is to provide a group of such compounds which have low volatility.

The above and related objects are accomplished by means of a group of diesters having the general formula:

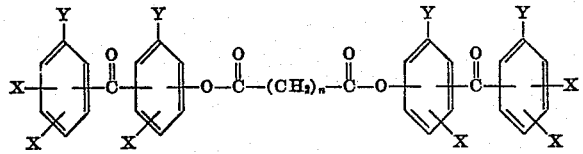

wherein $n$ is a whole number from 2 to 8, X may be hydrogen, halogen, or alkyl, and one Y in each benzophenone group is hydrogen and the other Y in each such group is hydroxyl. The objects are further realized with compositions comprising such diesters together with haloethylene polymers.

The diesters of this invention are easily prepared by known esterification reactions. In an illustrative preparation, 0.5 mole of adipyl chloride was added dropwise to 2 moles of 2,4-dihydroxybenzophenone in 1250 milliliters of toluene and 125 milliliters of pyridine. The reactants were stirred for 12 hours at 70 to 80° C. The reaction mixture was cooled, washed sequentially with water, 4 percent aqueous sodium hydroxide, dilute HCl and finally twice with water. The solvent was removed by distillation after which the product was recrystallized from alcohol. The dried bis(3-hydroxy-4-benzoyl phenyl) adipate was in the form of pale yellow crystals melting at 125 to 126° C. Other diesters may be prepared in a similar manner by employing as reactants the appropriate dihydroxy benzophenone and acyl chloride. As typical of other representative diesters may be mentioned Bis(p-salicyloyl phenyl) adipate
Bis(p-salicyloyl phenyl) succinate
Bis[3-hydroxy-4-(4-chlorobenzoyl)phenyl] adipate
Bis[3-hydroxy-4-(4-methylbenzoyl)phenyl] adipate
Bis(3-hydroxy-4-benzoyl-6-chlorophenyl) adipate The diesters of this invention are effective stabilizers for haloethylene polymers, particularly those polymers containing at least 50 percent vinylidene chloride. Such polymers are known to be especially sensitive to the effects of light. The compounds are effective when employed in amounts of from 1 to 10 percent, preferably 1 to 3 percent of the weight of the polymer used in the composition. Compositions containing less than 1 percent exhibit little more stability than unstabilized compositions. No beneficial result accrues from the use of more than 10 percent, and the cost and physical properties, such as strength, of the compositions suffer.

The diesters may be used in polymer compositions containing the common additives such as pigments, fillers, heat stabilizers, and plasticizers. They likewise may be used in combination with other known light stabilizers.

The advantages of the compositions of this invention will be more apparent from the following illustrative examples wherein all parts and percentages are by weight.

EXAMPLE 1

Two sample compositions were prepared from polyvinylidene chloride. One composition was left unstabilized for comparative purposes and to the other composition was added 5 percent of bis(p-salicyloylphenyl) adipate. The compositions were compression molded to a thickness of 0.015 inch. The moldings were exposed to direct sunlight at 43° N. latitude in the State of Michigan for 33 days. The degree of degradation due to exposure was determined by a comparison of light transmission through the moldings before and after exposure and is reported as percent loss in transmission in the following Table I.

Table I

| Stabilizer: | Percent loss of light transmission |
|---|---|
| None | 31.8 |
| Bis(p-salicyloylphenyl) adipate | 10.2 |

The stabilized composition undergoes only about one-third as great a color change as the corresponding but unstabilized composition.

EXAMPLE 2

Sample compositions were prepared from 89.5 parts of a copolymer prepared from 85 percent vinylidene chloride and 15 percent vinyl chloride, 0.5 part sodium tripolyphosphate as a heat stabilizer, 7 parts of a fatty acid ester of pentaerythritol sold commercially as J–15 by Hercules Powder Co. as a plasticizer, and 3 parts of various light stabilizers. Two compositions contained phenyl salicylate and 2-hydroxy-5-chlorobenzophenone as known light stabilizers and one composition was left unstabilized for comparative purposes. Compression moldings 0.01 inch in thickness were made and exposed to ultra-violet sun lamps for 4 days after which they were examined visually for discoloration and rated according to an arbitrary scale. In that scale 0 indicates colorless and 17 dark brown. The results are listed in Table II.

*Table II*

| Stabilizer: | Color after exposure |
|---|---|
| None | 17 |
| Phenyl salicylate | 7 |
| 2-hydroxy-5-chlorobenzophenone | 5 |
| Bis(3-hydroxy-4-benzoylphenyl) adipate | 3 |

Similar results are obtained in stabilizing polyvinyl chloride with any of the new diesters.

We claim:
1. As a new organic compound a diester having the following general formula:

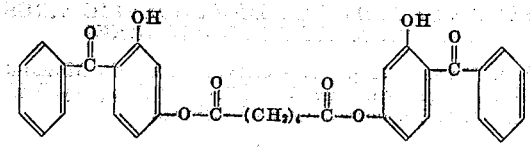

wherein $n$ is a positive whole number from 2 to 8, X is selected from the group consisting of hydrogen, chlorine, and alkyl having from 1 to 8 carbon atoms, and one Y in each benzophenone group is hydrogen and the other Y in each such group is hydroxyl.

2. As a new organic compound a diester having the formula:

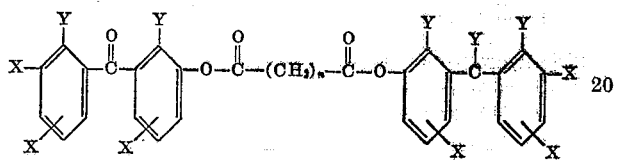

characterized by being in the form of pale yellow crystals melting at 125–126° C.

References Cited in the file of this patent
UNITED STATES PATENTS

| 2,157,068 | Carruthers | May 2, 1939 |
| 2,273,262 | Hanson | Feb. 17, 1942 |
| 2,353,684 | Miescher | July 18, 1944 |
| 2,632,769 | Bell | Mar. 24, 1953 |